Oct. 2, 1928.
A. J. McCOOK
1,686,287
BUMPER BRACKET
Filed March 8, 1927
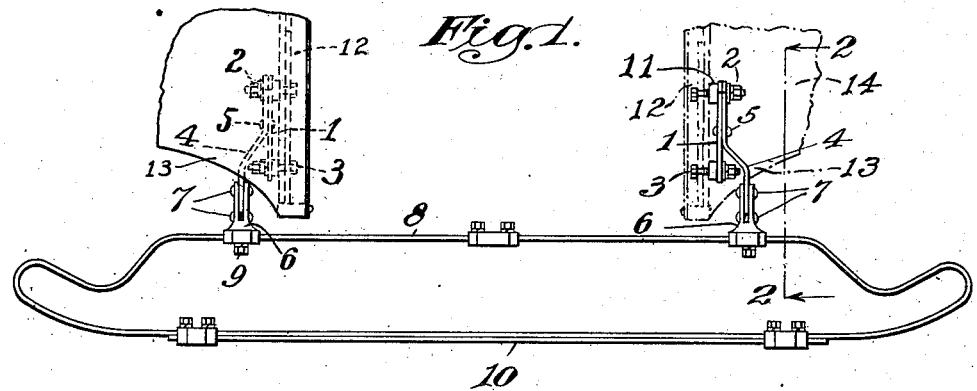
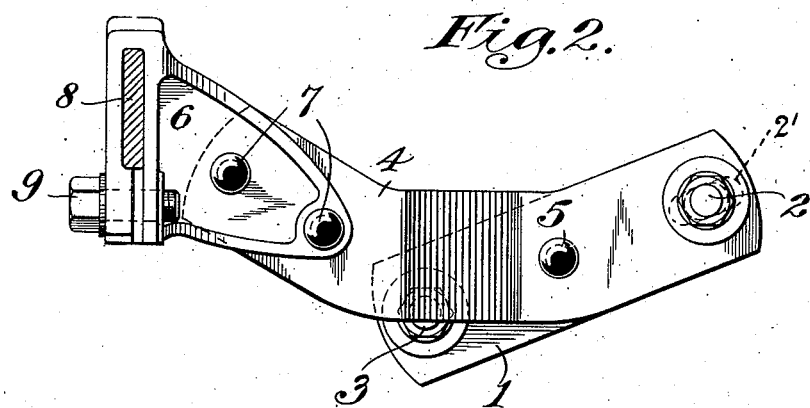
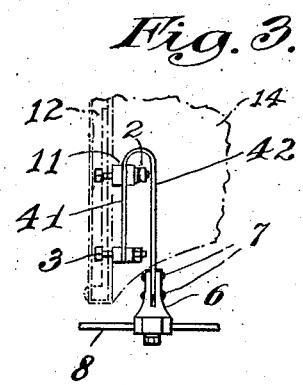
Inventor:
Arthur J. McCook
By his Attorney Patented Oct. 2, 1928.

1,686,287

UNITED STATES PATENT OFFICE.

ARTHUR J. McCOOK, OF STRATFORD, CONNECTICUT, ASSIGNOR TO AMERICAN CHAIN COMPANY, INC., A CORPORATION OF NEW YORK.

BUMPER BRACKET.

Application filed March 8, 1927. Serial No. 173,628.

This invention relates to automobile bumpers and more particularly to a bracket for attaching a bumper to the frame of a car having a laterally projecting mud-guard with a pan extending over the end of this frame.

The principal object of this invention is to provide a bracket which will pass under and around the overhanging pan of the mud-guard and may be expeditiously installed without alteration of the pan and without extra machining or drilling, and which will be pleasing to the eye.

The bracket comprises a bumper supporting part which has suitable clamping means to be secured to a bumper bar and is formed with an off-set portion adapted to be secured to the frame of an automobile, the off-set being so arranged as to clear the pan.

The invention may be embodied in a bracket having an auxiliary plate or member to be secured at two points to the frame end so as to provide a firm attachment for the bumper supporting part, the latter being bolted or riveted to the auxiliary member.

A clear conception of the construction, and other objects of the invention, may be had by reference to the specification, in conjunction with the accompanying drawings, in which:

Fig. 1 shows the preferred form of the invention in plan view in use on a vehicle, partly shown in outline.

Fig. 2 is a cross-section through 2—2 of Fig. 1.

Fig. 3 is a plan view of a modified form of bracket.

The now preferred form of the invention as shown in Fig. 1 comprises a plate 1, having holes therein through which bolts 2 and 3 may be passed to fasten plate 1 to the horn 12 of a vehicle frame. The hole 2' is slotted to permit adjustments, as already existing bolt holes in the horn are preferably used for securing the plate 1, thereby obviating the necessity of drilling new holes. Spacing members, consisting of collars such as 11, may be used to space plate 1 a sufficient distance from the horn to clear the rivet 5. A bar-supporting part 4, having a slotted hole coinciding with hole 2' in one end through which bolt 2 may be passed, is secured to plate 1 by rivet 5. The part 4 is preferably formed as shown in Fig. 1, having an offset of sufficient extent to pass under and around the pan 13 of mud-guard 14, shown in Fig. 1. A clamp 6 is secured to plate 4 by rivets 7, having jaws which are constructed to be gripped about a bumper bar such as 8, by means of a bolt 9, the bumper bar 8 being the rear or attaching member of a bumper such as 10.

A modified form of the bracket is shown in Fig. 3, and is similar in purpose to the preferred form described above, so that the same designating numerals will be used in part to simplify the description, the only material difference being the shape of the bar supporting member 42, which extends rearwardly and is bent outwardly and forwardly forming arm 41 thereby providing an off-set of sufficient extent to pass under and around the mud-guard. This bracket is secured directly to the horn instead of in the manner described above for the preferred form.

Either form of bracket provides a simple and effective bumper mounting which may be expeditiously secured in place without alteration of the pan and without extra drilling and machining, and is pleasing to the eye.

I claim:

1. A bumper bracket for automobiles of the type described in which the spring and horn at the end of a frame member are masked by an upright pan, said bracket comprising a bumper-supporting part having means to hold a bumper bar, and an attachment part adapted to be secured adjustably and firmly to said horn by bolts passing through existing holes in said horn beneath said pan, said parts being connected by a portion offset to clear said pan.

2. A bumper bracket for automobiles of the type described in which the spring and horn at the end of a frame member are masked by an upright pan, said bracket comprising a plate for connection with said horn by bolts passing through existing holes in said horn beneath said pan, an arm secured to said plate having a pair of bends therein to clear said pan and a clamping means on said arm for holding the attaching bar of a bumper.

3. A bumper bracket for automobiles of the type described in which the spring and horn at the end of a frame member are masked by an upright pan, said bracket comprising a plate bolted to said horn by bolts passing through existing holes in said horn beneath said pan, an arm riveted thereto, a bend in said arm adapted to clear said pan and clamping means on the extremity of said arm adapted to co-operate with the rear or attaching bar of a bumper.

4. A bumper bracket for automobiles of the type described in which the horn at the end of a frame member is masked by an upright pan, said bracket comprising a plate for attachment to said horn adjustably by bolts extending into existing holes at two points in said horn beneath said pan, an arm secured thereto, and having a bend adapted to clear said pan, and a clamp secured to the extremity of said arm, said clamp having jaws adapted to be bolted in close engagement about the rear or attaching bar of a bumper, said plate, arm and clamp constituting a rigid unitary structure capable of adjustment as such.

In testimony whereof, I have signed this specification.

ARTHUR J. McCOOK.